(12) United States Patent
Smullen

(10) Patent No.: US 9,816,540 B2
(45) Date of Patent: Nov. 14, 2017

(54) CLIP

(71) Applicant: Jennifer Smullen, Middletown, MD (US)

(72) Inventor: Jennifer Smullen, Middletown, MD (US)

( * ) Notice: Subject to any disclaimer, the term of this patent is extended or adjusted under 35 U.S.C. 154(b) by 0 days.

(21) Appl. No.: 15/229,273

(22) Filed: Aug. 5, 2016

(65) Prior Publication Data

US 2017/0037885 A1 Feb. 9, 2017

Related U.S. Application Data

(60) Provisional application No. 62/202,238, filed on Aug. 7, 2015.

(51) Int. Cl.
| *F16B 2/22* | (2006.01) |
| *A47K 10/14* | (2006.01) |
| *D06F 55/00* | (2006.01) |
| *F16B 2/24* | (2006.01) |
| *F16B 5/06* | (2006.01) |

(52) U.S. Cl.
CPC .............. *F16B 2/22* (2013.01); *A47K 10/14* (2013.01); *D06F 55/00* (2013.01); *F16B 2/24* (2013.01); *F16B 5/0692* (2013.01)

(58) Field of Classification Search
CPC . F16B 2/22; F16B 2/24; F16B 5/0692; A47K 10/14; D06F 55/00
See application file for complete search history.

(56) References Cited

U.S. PATENT DOCUMENTS

| 101,720 | A | | 4/1870 | Farnsworth |
| 446,819 | A | | 2/1891 | Ostergren |
| 1,782,057 | A | | 11/1930 | Bollinger |
| D90,930 | S | | 10/1933 | Todd |
| 1,962,953 | A | | 6/1934 | Erwin |
| 2,058,416 | A | | 10/1936 | Comstock |
| 2,470,811 | A | * | 5/1949 | Engleman .............. A47K 10/12 24/339 |
| 2,694,242 | A | | 11/1954 | Stageberg |
| 2,861,318 | A | | 11/1958 | Fernberg |

(Continued)

OTHER PUBLICATIONS http://www.aliexpress.com/item/Newly-Design-Bright-Colors-8-PCS-Biig-Size-Strong-Beach-Towel-Clips-Keep-Your-Towel-from/32403560780.html Jul. 1, 2015.

(Continued)

*Primary Examiner* — David Upchurch
(74) *Attorney, Agent, or Firm* — Leveque IP Law, P.C.

(57) ABSTRACT

A clip for removably and releasably securing an item onto a structure may include a singular, elongated body with an interior portion forming a cavity on the bottom end of the elongated body. The cavity may be sized and shaped to receive an edge of the structure for removably securing the clip to the structure. The clip may include a pushing surface sized and shaped for a user to removably secure the clip on the edge of the structure. The clip may also include a first set of two or more tabs disposed along the side portions of the elongated body and projected out at an acute angle, the first set of two or more tabs sized and shaped to provide a gripping surface on the side portions of the elongated body for the user to pull the clip off of the edge of the structure.

20 Claims, 11 Drawing Sheets

(56) References Cited

U.S. PATENT DOCUMENTS

| | | | | |
|---|---|---|---|---|
| 2,946,157 | A | * | 7/1960 | Franz .................... A47K 10/10 248/27.1 |
| 3,335,467 | A | | 8/1967 | Freed |
| D210,860 | S | | 4/1968 | Schellens |
| 3,762,108 | A | * | 10/1973 | Pierson ................. B29C 65/565 24/555 |
| D241,314 | S | * | 9/1976 | Norman ........................ D11/27 |
| 4,095,608 | A | * | 6/1978 | Holmes ................. G07D 9/004 206/0.82 |
| D257,950 | S | | 1/1981 | Van Meter, Jr. et al. |
| 4,261,121 | A | | 4/1981 | Coon |
| D291,728 | S | * | 9/1987 | Hoyt ........................... D24/130 |
| 4,858,285 | A | | 8/1989 | Dala et al. |
| D304,978 | S | | 12/1989 | Harrington |
| 4,934,540 | A | | 6/1990 | Novak |
| D313,503 | S | | 1/1991 | Senitt |
| D317,116 | S | | 5/1991 | Nimtz |
| 5,018,260 | A | * | 5/1991 | Ziu ........................... F16L 7/00 138/108 |
| D320,874 | S | | 10/1991 | Emmons |
| 5,133,114 | A | * | 7/1992 | Terada .................... F16B 2/245 24/563 |
| 5,226,846 | A | | 7/1993 | Onori |
| 5,236,725 | A | * | 8/1993 | McCormack ........... G09F 23/00 40/666 |
| 5,246,020 | A | | 9/1993 | Wu |
| 5,293,713 | A | * | 3/1994 | Ahmed .................... A01G 5/04 24/561 |
| 5,351,371 | A | * | 10/1994 | DeVeau, Jr. .......... G02B 6/3806 24/459 |
| D363,016 | S | * | 10/1995 | Sipprelle, III ................ D8/395 |
| D364,188 | S | | 11/1995 | Wolff |
| 5,584,456 | A | | 12/1996 | Stephens |
| 5,611,123 | A | | 3/1997 | Prizzi |
| 5,802,677 | A | | 9/1998 | Dorman et al. |
| 5,803,484 | A | * | 9/1998 | Orme .................. B60R 21/2171 24/546 |
| 5,829,832 | A | | 11/1998 | Molee et al. |
| D406,051 | S | | 2/1999 | Ross |
| 5,960,520 | A | | 10/1999 | Conway et al. |
| D417,612 | S | | 12/1999 | Jones |
| D425,127 | S | | 5/2000 | Mackey |
| D426,416 | S | | 6/2000 | Petrishen |
| D426,577 | S | | 6/2000 | Mackey |
| D433,318 | S | | 11/2000 | Chang |
| D435,684 | S | | 12/2000 | Gary et al. |
| D451,007 | S | | 11/2001 | Jones et al. |
| D463,325 | S | | 9/2002 | Savoia |
| 6,490,768 | B1 | | 12/2002 | Goodall |
| D470,937 | S | | 2/2003 | Gary et al. |
| D509,319 | S | | 9/2005 | Chen |
| D537,331 | S | | 2/2007 | Hill |
| D578,382 | S | * | 10/2008 | Petrocofski .................... D8/395 |
| D586,649 | S | * | 2/2009 | Fleischman .................... D8/396 |
| D587,563 | S | * | 3/2009 | Fleischman .................... D8/396 |
| 7,608,782 | B2 | * | 10/2009 | Hill .......................... H01R 4/48 174/84 C |
| 7,707,681 | B1 | * | 5/2010 | Cabak ....................... B60S 1/38 15/250.31 |
| 7,721,396 | B2 | * | 5/2010 | Fleischman .............. A47C 1/14 24/303 |
| D623,048 | S | | 9/2010 | Moy |
| D632,554 | S | * | 2/2011 | Grzyb ........................... D8/395 |
| 7,921,527 | B2 | | 4/2011 | Moy |
| 7,963,010 | B2 | | 6/2011 | Levesque |
| D648,620 | S | * | 11/2011 | Wagner ......................... D8/396 |
| D659,527 | S | | 5/2012 | Boucher-Gagne |
| D661,461 | S | | 6/2012 | Murray |
| D671,823 | S | | 12/2012 | van der Lande |
| D682,464 | S | | 5/2013 | Gary et al. |
| D692,689 | S | | 11/2013 | Yiannaki |
| D695,550 | S | * | 12/2013 | Yiannaki ....................... D6/606 |
| D706,616 | S | | 6/2014 | Katz |
| D707,546 | S | | 6/2014 | Katz |
| D729,542 | S | | 5/2015 | Dontfraid |
| D775,534 | S | | 1/2017 | Turksu et al. |
| D796,946 | S | | 9/2017 | Pittman |
| 2001/0022014 | A1 | | 9/2001 | Smith |
| 2010/0088863 | A1 | * | 4/2010 | Moy ......................... A47K 10/14 24/459 |
| 2010/0325842 | A1 | | 12/2010 | Rivera |
| 2014/0208548 | A1 | * | 7/2014 | Wasco ....................... F16B 2/20 24/458 |

OTHER PUBLICATIONS https://web.archive.org/web/20070909012653/http://www.biminiclip.com/ Sep. 9, 2007.

https://web.archive.org/web/20100504163252/http://bocaclips.com/ May 4, 2010.

https://web.archive.org/web/20090113212206/http://www.creativetowelclips.com/ Jan. 13, 2009.

https://web.archive.org/web/20150626132843/https://gettuggs.com/ Jun. 26, 2015.

https://web.archive.org/web/20130718142818/http://thebeachclip.com/ Jul. 18, 2013.

* cited by examiner

CLIP

CROSS-REFERENCE TO RELATED APPLICATIONS

This application claims the benefit of U.S. Provisional Application No. 62/202,238 filed on Aug. 7, 2015, which is hereby incorporated by reference in its entirety.

BACKGROUND

Prior art clips for securing towels and the like to structures, in general, may be easily broken. This may be because of their shape, or because they are made from cheap molded plastic material having no reinforcement structure or similar. There remains a need for improved solutions to removably secure towels and the like to structures.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
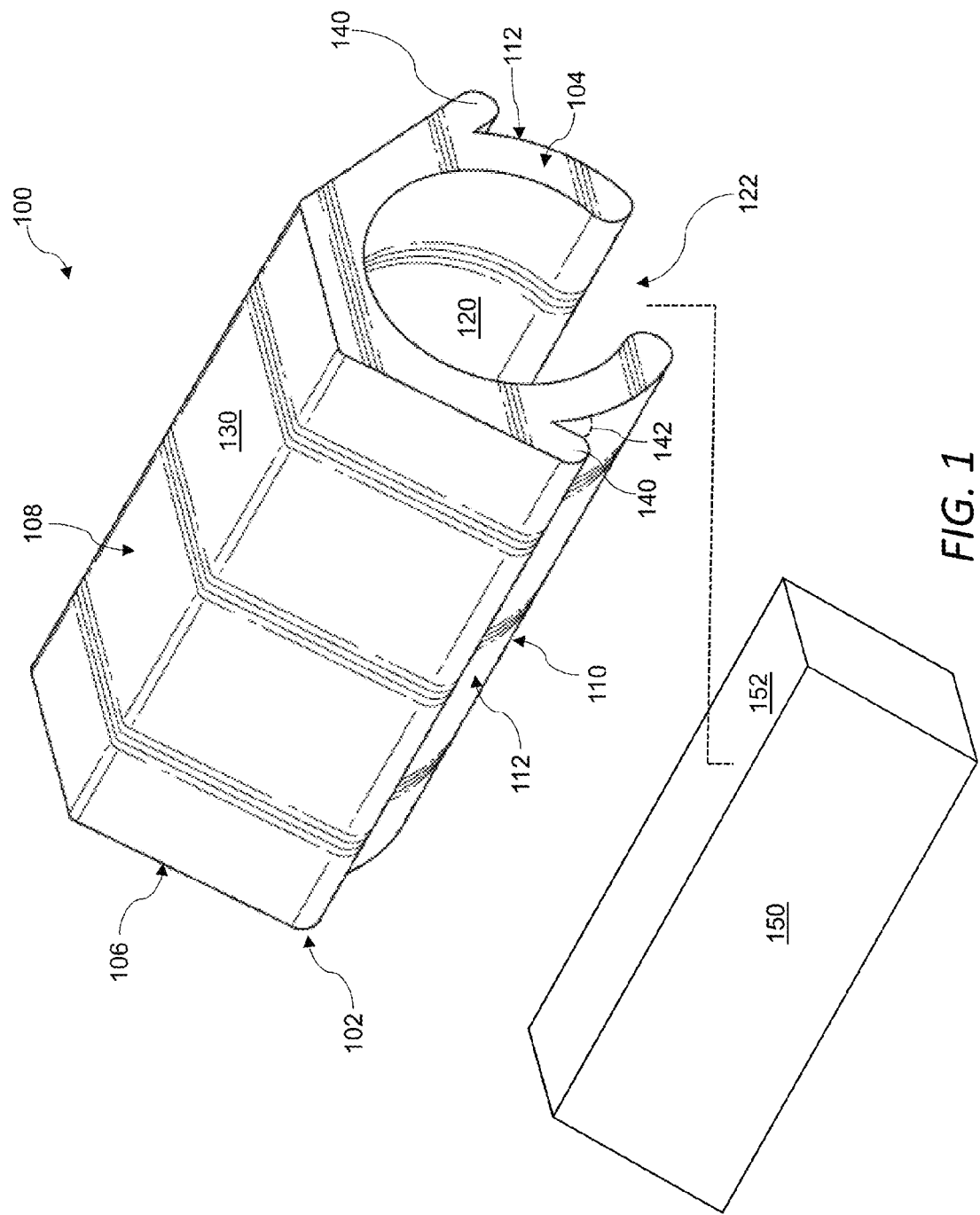
FIG. 1 illustrates a top perspective view of a towel clip, in accordance with a representative embodiment.

The various methods, systems, apparatus, and devices described herein generally provide for securing towels or the like to structures such as beach chairs and the like.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.,"

"such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms.

In general, the devices, systems, and methods described herein may include a clip to releasably secure an item to a structure. Although implementations may emphasize use of the clip described herein for use with a towel (e.g., a "towel clip"), one skilled in the art will recognize that clips described herein may also or instead be used for releasably securing other items, such as clothing, personal items, bags (e.g., bags with handles, straps, or the like), tablecloths, blankets, flags, signs, and the like. As such, unless explicitly stated to the contrary or otherwise clear from the context, any reference to a "towel" shall include towels in a traditional sense as well as other items as described above or otherwise known in the art. Similarly, the clips described herein may be interchangeably referred to as a "clip," a "towel clip," or the like, where such terms shall have the same meaning unless explicitly stated to the contrary or otherwise clear from the context.

The characteristics of the item (e.g., a towel or the like) to be removably and releasably secured by one or more embodiments of the clips described herein may vary. Similarly, the characteristics of the clips described herein can vary depending upon the characteristics of the item to be removably and releasably secured (e.g., the size, weight, material, shape, and so on). The clip removably securing an item to a structure shall include embodiments where the clip may be removed from one or more of the item and the structure, and where the item and the clip may be both removed from the structure (e.g., substantially simultaneously). The clip releasably securing an item to a structure shall include embodiments where the clip may be readily released from its engagement with one or more of the item and the structure, and where the item and the clip may be both be readily released from an engagement with the structure. The clip may also be structurally configured so that it can repeatedly removably and releasably secure an item to a structure.

The structure to which a towel or other item may be secured using the towel clip may include without limitation one or more of a chair (e.g., a beach chair, a lounge chair, a recliner, a rocking chair, a dining chair, and the like), a deck, a railing, a table, a line or string (e.g., a clothesline), a toy, an umbrella, a cooler, a basket, a cord, a wire, and the like.

In an aspect, the towel clips described herein may be used as promotional items. For example, a beach resort, an equipment company, a food/beverage provider, a service provider, a goods provider or retailer, or the like, may distribute the towel clips to customers or potential customers. By way of example, beach resorts often provide towels and lounge chairs for their guests. The same resorts may provide the towel clips as described herein to their guests, where each of the towel clips includes promotional branding or the like on a surface thereof.

FIG. 1 illustrates a top perspective view of a towel clip, in accordance with a representative embodiment. The clip 100 may be used to removably and releasably secure an item (e.g., a towel or the like) onto a structure 150 or the like (e.g., the clip 100 may be a "towel clip"). In an aspect, the structure 150 may include the top back edge of a chair (e.g., a beach chair). The size, shape, configuration, and overall design of the clip 100 may allow for ergonomic use by a user and may allow for improved results, e.g., releasably securing the towel such that the towel and clip can be removed by a user when desired, but not when undesired (e.g., by wind gusts, by the weight of the towel, or the like).

The clip 100 may include an elongated body 102, an interior portion 120, a pushing surface 130, and tabs 140.

The elongated body 102 may be a singular body or housing. In other words, the elongated body 102 of the clip 100, and components/features integrated therein or thereon, may be the sole component of the clip 100. In this manner, the clip 100 need not include multiple pieces or require complex manufacturing techniques to construct. As such, the clip 100 may differ from devices such as clothespins and the like, which typically include two bodies joined together by a spring hinge or the like for pinching items between distal ends of the two bodies.

The elongated body 102 may include a first end 104, a second end 106, a top end 108, a bottom end 110, and side portions 112 disposed between the top end 108 and the bottom end 110.

In an aspect, the first end 104 and the second end 106 are substantially identical. In another aspect, the first end 104 and the second end 106 are different. For example, the dimensions of the first end 104 may be larger than those of the second end 106, e.g., in an embodiment where the elongated body 102 includes a substantially tapered shape, e.g., where its inner diameter is wider on one end than the other.

The bottom end 110 of the clip 100 may include a cavity 122. Specifically, the interior portion 120 may form a cavity 122 on the bottom end 110 of the elongated body 102, where the cavity 122 extends between the first end 104 and the second end 106.

The cavity 122 may be sized and shaped to receive an edge 152 of the structure 150 for removably securing the clip 100 to the structure 150. As shown in the figure, the cross-section of the cavity 122 may be substantially circular. This shape may advantageously be used to releasably secure the clip 100 onto structures having different shapes, e.g., a structure 150 that has a flat edge (e.g., such as the edge 152 of the substantially box-shaped or rectangular-shaped structure 150 shown in the figure), or structures having a curved edge (not shown) such as a cylinder, tube, or the like, or structures having angled edges (not shown). Other aspects of the clip may have different shapes of the cross-section of the cavity for engaging with structures (e.g., structures similar to the structure 150 shown in the figure or different structures). For example, a clip with a substantially box-shaped cross-section of the cavity (see, e.g., FIG. 9) may be used to engage with a structure having a similar boxed shape, or a clip with a substantially circular cross-section of the cavity may be used to engage with a structure having a similar rounded shape. Thus, one skilled in the art will understand that the cross-sections of clips 100 may be different, and the shapes of structures 150 may be different. Also, as stated above, the clips 100 may be used for structures not having similar shapes to that of the cross-sections of clips 100, such as shown in the figure.

The clip 100 may include a pushing surface 130 formed on the top end 108 of the elongated body 102 of the clip 100. The pushing surface 130 may be sized and shaped for a user to removably secure the clip 100 on the edge 152 of the structure 150 by applying a force to the pushing surface 130. The pushing surface 130 of the elongated body 102 may include a substantially flat surface as shown in the figure. The substantially flat surface may allow for a user to easily press against the pushing surface 130 when removably securing the clip 100 onto the edge 152 of the structure 150. The substantially flat surface of the pushing surface 130 may also provide a space for including, e.g., one or more of text, numbering, or a design, such as for promotional purposes.

The clip 100 may further include tabs 140. For example, the two tabs 140 shown in the figure may represent a first set of two or more tabs disposed along the side portions 112 of the elongated body 102. The tabs 140 in the first set of tabs may be substantially mirrored from one another on opposing side portions 112 of the elongated body 102. In another aspect, the tabs 140 in the first set of tabs may be different, e.g., with one tab including a hook or other feature thereon, or with one tab larger than the other tab.

The tabs 140 in the first set of tabs may be projected out from the side portions 112 of the elongated body 102 at an acute angle 142, i.e., relative to the side portions 112 of the elongated body 102.

The tabs 140 in the first set of tabs may be sized and shaped to provide a gripping surface on the side portions 112 of the elongated body 102 for a user to pull the clip 100 off of the edge 152 of the structure 150. The tabs 140 in the first set of tabs may also or instead be sized and shaped to provide a gripping surface on the side portions 112 of the elongated body 102 for a user to secure the clip 100 onto the edge 152 of the structure 150.

In an aspect, a user pulls the tabs 140 to widen the cavity 122 in the clip 100. In this manner, the acute angle 142 from which the tabs 140 in the first set of tabs are projected out from the side portions 112 of the elongated body 102 may provide a user with a gripping surface for pulling the tabs 142 to widen an opening of the cavity 122 in the clip. This may aid a user in pulling the clip 100 off of the edge 152 of the structure 150 or releasably securing the clip 100 onto the edge 152 of the structure 150.

Each of the tabs 140 in the first set of tabs may be projected out substantially from the widest dimension of the side portions 112 of the elongated body 102 of the clip 100. In this manner, the tabs 140 may be relatively easy for a user to grab when gripping and handling the clip 100, e.g., when placing the clip 100 onto the edge 152 of the structure 150 or removing the clip 100 from the edge 152 of the structure 150. Similarly, each of the tabs 140 in the first set of tabs may be projected out substantially from a central location of the side portions 112 of the elongated body 102 of the clip 100. The central location may be located midway between the top end 108 of the clip 100 and the bottom end 110 of the clip 100.

Each of the tabs 140 included on the clip 100 may be disposed along an entire length of the elongated body 102 of the clip 100 as shown in the figure. In an alternate embodiment, one or more of the tabs 140 may be disposed along only a portion of the length of the elongated body 102.

Figure 2:
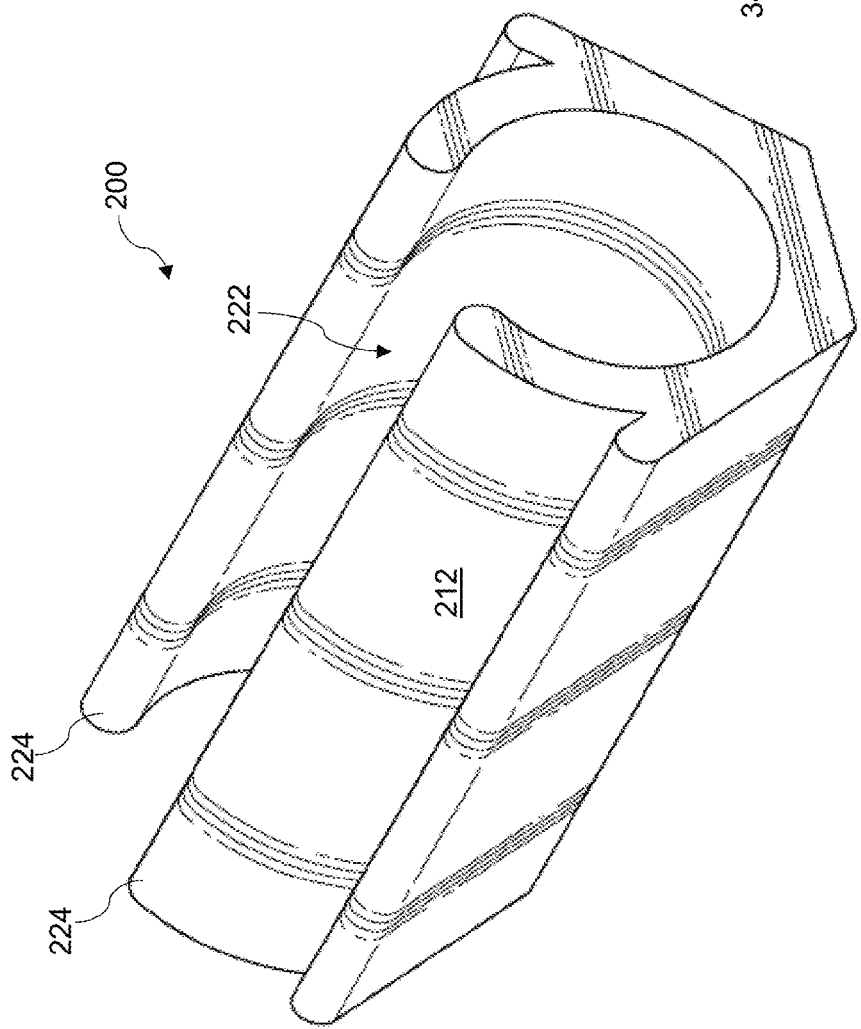
FIG. 2 illustrates a bottom perspective view of a towel clip, in accordance with a representative embodiment.

FIG. 2 illustrates a bottom perspective view of a towel clip, in accordance with a representative embodiment. The clip 200 shown in this figure may be substantially the same clip as that shown in FIG. 1, but rotated vertically 180 degrees along a longitudinal axis through the elongated body. This figure clearly shows the cavity 222, which again can be widened by pulling the tabs of the clip 200.

As shown in the figure, the cavity 222 may be formed on the bottom end of the clip 200, where an opening of the cavity 222 for receiving an edge of a structure is disposed between the ends 224 of the side portions 212 of the elongated body.

Figure 3:
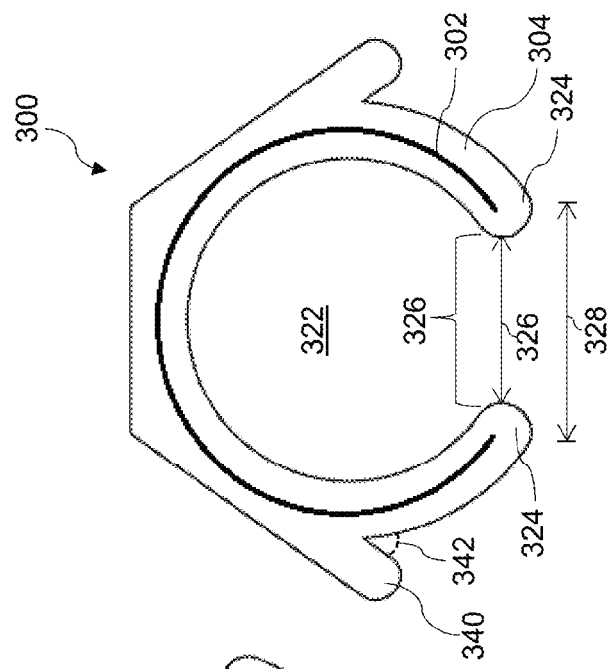
FIG. 3 illustrates a cross-sectional view of a towel clip, in accordance with a representative embodiment.

FIG. 3 illustrates a cross-sectional view of a towel clip, in accordance with a representative embodiment. The clip 300 shown in this figure may include a plurality of materials that make up the elongated body of the clip 300. For example, the elongated body of the clip 300 may include an interior member 302 and an exterior member 304 (e.g., an exterior coating). The interior member 302 may be made of a first material and the exterior member 304 may form an exterior coating made of a second material substantially surrounding the interior member 302. In an aspect, the first material is different than the second material, e.g., the first material may have a greater hardness than the second material. In an implementation, the exterior member 304 is molded around the interior member 302.

As shown in the figure, and as described above, a cavity 322 may be formed within the clip 300, where an opening 326 of the cavity 322 for receiving an edge of a structure is disposed between ends 324 of the side portions of the elongated body. The ends 324 of the side portions adjacent to the cavity 322 of the elongated body may be separated by a first distance 326 when no forces are applied to the clip 300. The ends 324 of the side portions of the elongated body may be structurally configured to be widened to a second distance 328 greater than the first distance 326, e.g., to accept the edge of the structure within the cavity 322. In this manner, the first material and the second material may each comprise an elasticity selected such that the ends 324 of the side portions are structurally configured to be widened to the second distance 328 and to substantially return to the first distance 326 when the clip 300 is removed from the edge of the structure.

The first material may include a metal. For example, the first material may include one or more of steel (e.g., stainless steel or manganese steel), a shape memory alloy, and the like. For example, in an aspect, one or more of a manganese steel (e.g., having a hardness of about HRC=80), a spring steel, or another suitably strong material may be used for the interior member 302. In an aspect, the spring steel (or other material) of the interior member 302 allows for the flexibility of the clip 300 in order to slide onto the edge of a structure such as a back top edge of a chair.

The second material may include a plastic. The second material may also or instead include an elastomer. In an aspect, the second material includes silicone or the like (e.g., medical grade silicone). The second material (i.e., the exterior member 304) may be press molded onto the first material (i.e., the interior member 302) in fabricating the clip 300. Thus, the interior member 302 may be relatively strong and hard, whereas the exterior member 304 or coating may be a softer (e.g., grippy) material. In other words, an embodiment may include a metal material (e.g., steel) encased in a softer material (e.g., silicone). One or more of the first material and the second material may be any color or texture as desired.

As discussed above, the interior member 302 may include a hardness or rigidity such that the interior member 302 is capable of holding the shape of the clip 300 (the shape before any forces are applied to the clip 300) even after being repeatedly placed upon and removed from a structure upon which the clip 300 is removably attached. In an aspect, in order to accommodate a structure into its generally round or circular shaped interior, which shape may be the approximate dimension or perhaps slightly larger than the approximate dimension of the mouth of the round interior portion of the clip 300, the interior member 302 of the clip 300 may be able to be deflected (opened) enough to accept the edge of the structure onto which the clip 300 is to be removably affixed. In this regard, the interior member 302 may be of various gauges of metal or other suitable material as discussed herein. In general, the thicker the metal that is used, the stronger the clip 300 may be, but also the harder the clip 300 may be for a user to place over an edge of a structure. Thus, metals such as manganese steel and the like may be preferred for the interior member 302.

This figure also clearly shows the tabs 340 (e.g., in a first set of tabs) projected out from the side portions at acute angles 342. In an aspect, the tabs 340 are disposed about halfway between the top end of the clip 300 and the bottom end of the clip 300. In another aspect, the tabs 340 are disposed about ⅓ of the way down along the height of the clip 300 as measured from the top end. In another aspect, the tabs 340 are disposed about ⅔ of the way down along the height of the clip 300 as measured from the top end. One skilled in the art will recognize that the tabs 340 may also or instead be disposed in other locations along the height of the clip 300 or otherwise, e.g., at the top end and bottom end of the clips as shown in other figures herein.

As shown in FIGS. 1-3, a clip may include one set of middle tabs that can be gripped by a user and used to pull the clip off of an edge of a structure (e.g., the back of a chair or other surface onto which a towel or other item has been removably affixed by the clip). Thus, the tabs can be used by the user to pull the towel clip off a surface to which it has been clipped. Similarly, the tabs may be used to push the clip down onto an edge of a structure of suitable size and dimensions to be received by the interior portion (e.g., substantially circular interior portion) of the clip. In particular, a force exerted by a user on the top portion of the clip may be especially useful for pushing the clip onto an edge of a structure. The tabs may also or instead be used for placing the clip onto an edge of a structure.

Figure 4:
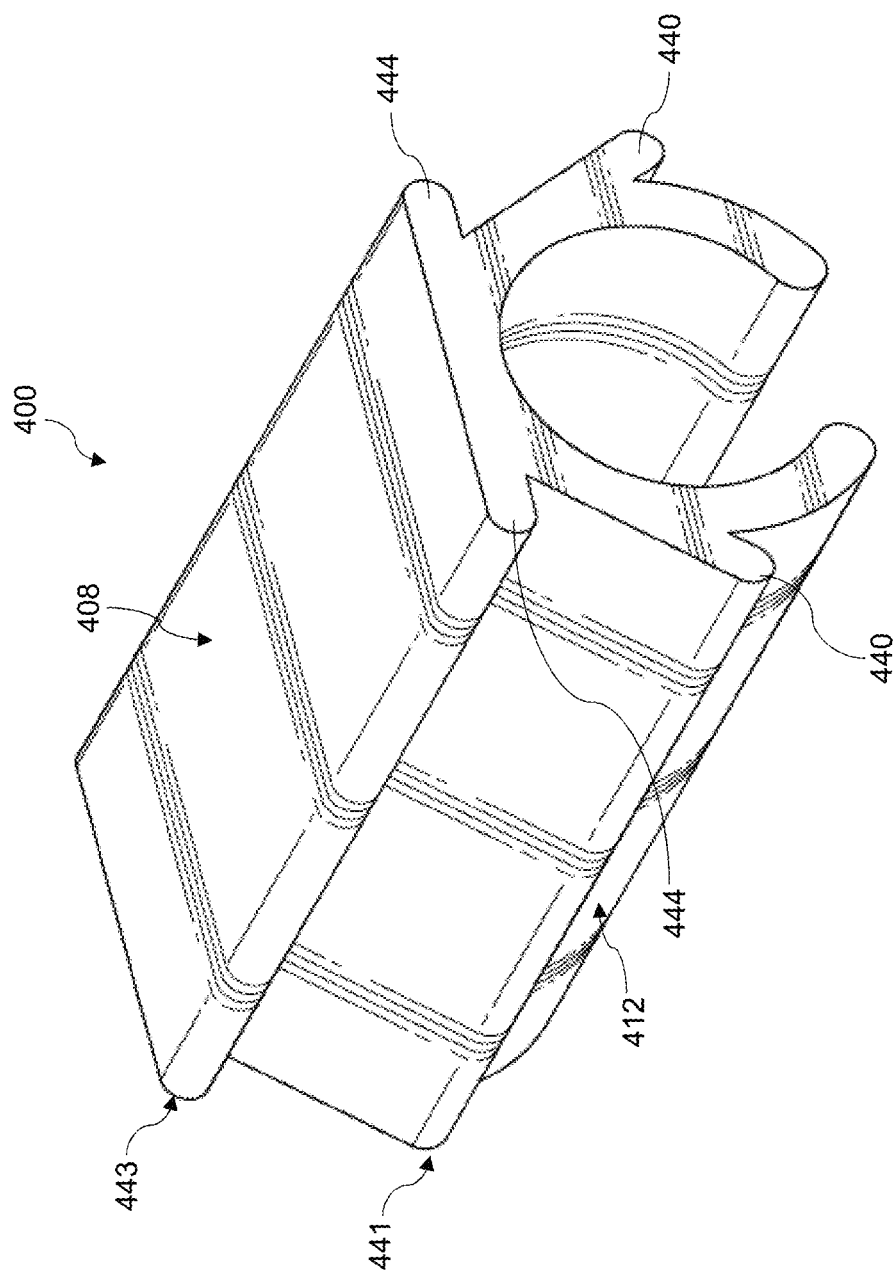
FIG. 4 illustrates a top perspective view of a towel clip, in accordance with a representative embodiment.

FIG. 4 illustrates a top perspective view of a towel clip, in accordance with a representative embodiment. As shown in the figure, the clip 400 may include a plurality of sets of tabs. For example, the clip 400 may include a first set 441 of tabs formed by first tabs 140 projected from the side portions 412 of the elongated body of the clip 400, and a second set 443 of tabs formed by second tabs 444 projected from the top end 408 of the elongated body of the clip 400.

The second set 443 of tabs may be disposed such that they extend beyond the edges of the top end 408 of the elongated body of the clip 400. In this manner, these tabs 444 may extend a substantially flat surface of the top end 408 of the clip 400. Thus, these tabs 444 may extend substantially laterally from the top end 408 as shown. Alternatively, these tabs 444 may be disposed at an angle (not shown).

In FIG. 4, it can be seen that the clip 400 may include two sets of tabs, upper and middle tabs, that can be gripped by a user and used to pull the clip 400 off of an edge of a structure (e.g., the back of a chair or other surface onto which a towel or other item has been removably affixed by the clip 400). Thus, any one of the two sets of tabs, or combination of the two sets of tabs, can be used by the user to pull the clip 400 off of a surface onto which it has been clipped. In this manner, grabbing more than one of the sets of tabs may make it easier to pull the clip 400 off of a structure. Similarly, any one of the two sets of tabs, or combination of the sets of tabs, may be used to push the clip 400 down onto an edge of a structure of suitable size and dimensions to be received by the interior portion (e.g., substantially circular interior portion) of the clip 400. In particular, a force exerted by a user on the top portion of the clip 400 may be especially useful for pushing the clip 400 onto an edge of a structure.

Figure 5:
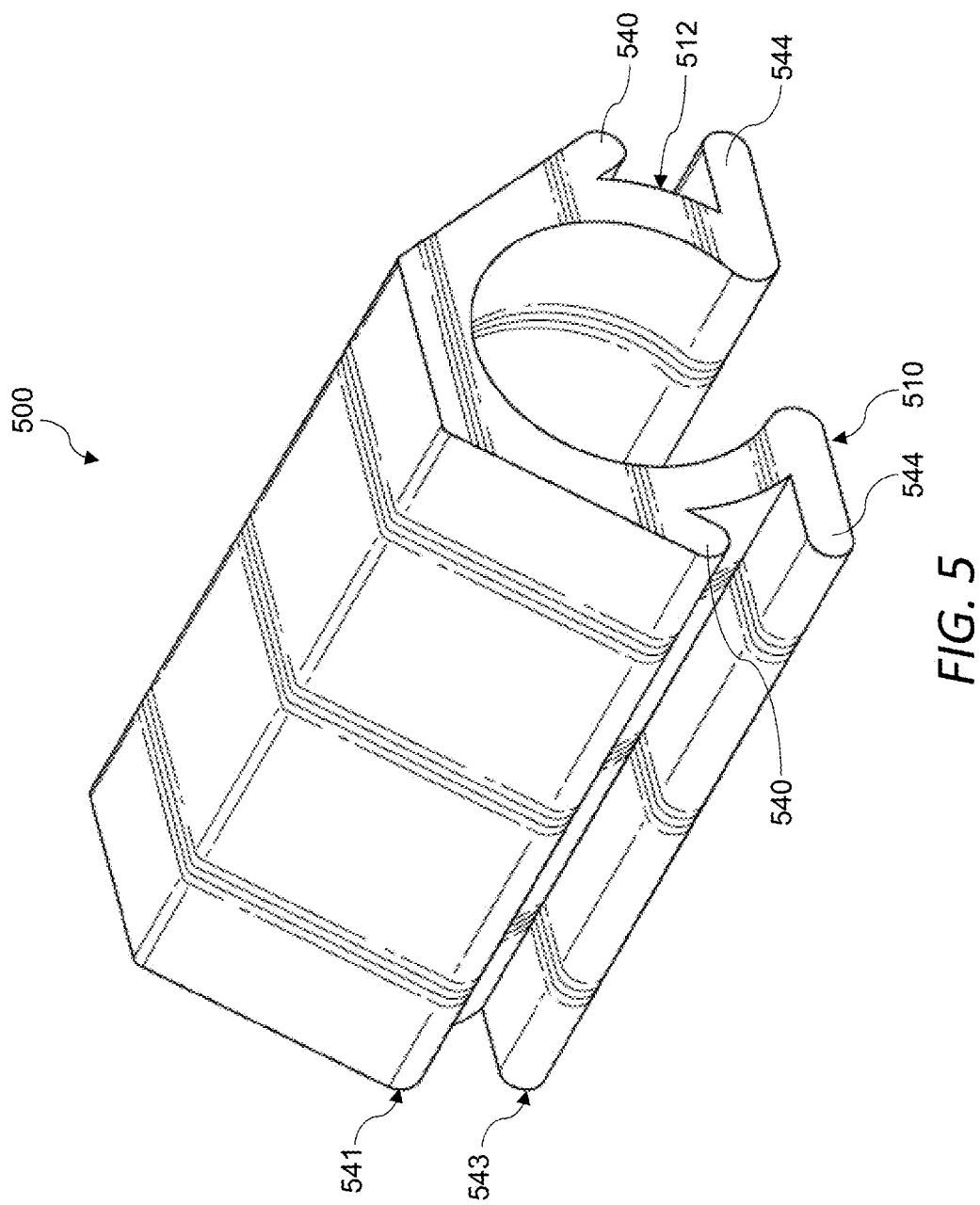
FIG. 5 illustrates a top perspective view of a towel clip, in accordance with a representative embodiment.

FIG. 5 illustrates a top perspective view of a towel clip, in accordance with a representative embodiment. As shown in the figure, the clip 500 may include a plurality of sets of tabs. For example, the clip 500 may include a first set 541 of tabs formed by first tabs 540 projected from the side portions 512 of the elongated body of the clip 500, and a second set 543 of tabs formed by second tabs 544 projected from the bottom end 510 of the elongated body of the clip 500.

The second set 543 of tabs may be disposed such that they extend along the base (e.g., the bottom end 510) of the elongated body of the clip 500. In this manner, these tabs 544 may extend substantially laterally from the bottom end 510 as shown. Alternatively, these tabs 544 may be disposed at an angle (not shown).

In FIG. 5, it can be seen that the clip 500 may include two sets of tabs, middle and lower, that can be gripped by a user and used to pull the clip 500 off of an edge of a structure (e.g., the back of a chair or other surface onto which a towel or other item has been removably affixed by the clip 500). Thus, any one of the two sets of tabs, or combination of the two sets of tabs, can be used by the user to pull the clip 500 off of a surface to which it has been clipped. In this manner, grabbing more than one of the sets of tabs may make it easier to pull the clip 500 off. Similarly, any one of the two sets of tabs, or combination of the sets of tabs, may be used to push the clip 500 down onto an edge of a structure of suitable size and dimensions to be received by the interior portion (e.g., substantially circular interior portion) of the clip 500. In particular, a force exerted by a user on the top portion of the clip 500 may be especially useful for pushing the clip 500 onto an edge of a structure.

Thus, as shown in FIGS. 4 and 5 above, the clip may include a second set of two or more tabs disposed on at least one of the top end of the elongated body and the bottom end of the elongated body. The first set of two or more tabs and the second set of two or more tabs may be positioned to allow a user to simultaneously grab tabs from both the first set and the second set for use as the gripping surface to secure the clip onto an edge of a structure and to pull the clip off of the edge of the structure.

Figure 6:
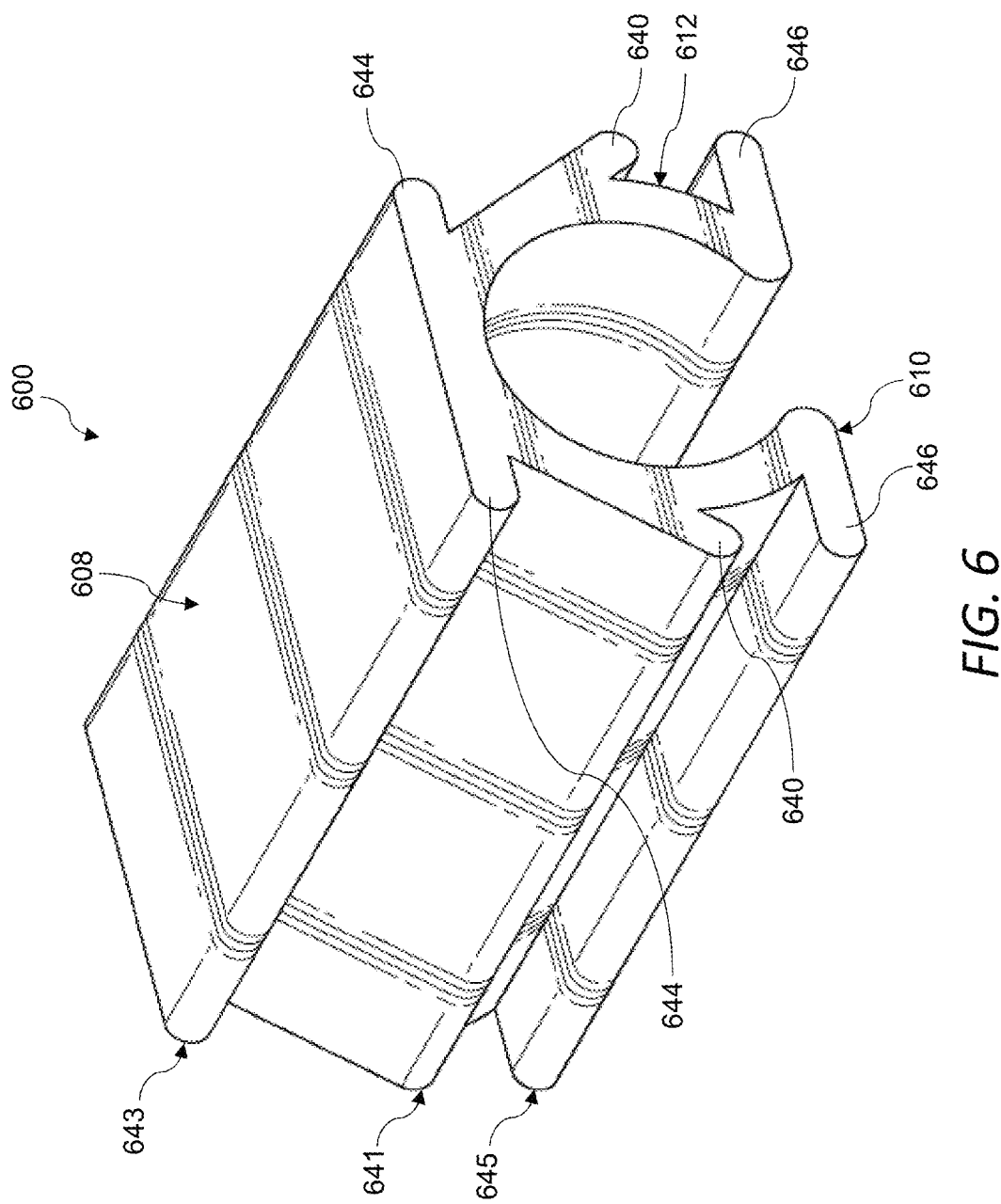
FIG. 6 illustrates a top perspective view of a towel clip, in accordance with a representative embodiment.

FIG. 6 illustrates a top perspective view of a towel clip, in accordance with a representative embodiment. As shown in the figure, the clip 600 may include a plurality of sets of tabs. For example, the clip 600 may include a first set 641 of tabs formed by first tabs 640 projected from the side portions 612 of the elongated body of the clip 600, a second set 643 of tabs formed by second tabs 644 projected from the top end 608 of the elongated body of the clip 600, and a third set 645 of tabs formed by third tabs 646 projected from the bottom end 610 of the elongated body of the clip 600.

In the embodiment shown in FIG. 6, the first set 641 of two or more tabs, the second set 643 of two or more tabs, and the third set 645 of two or more tabs may be positioned to allow a user to simultaneously grab each of the first set 641, the second set 643, and the third set 645 of tabs for use as a gripping surface to secure the clip 600 onto an edge of a structure and to pull the clip 600 off of the edge of the structure.

Figure 7:
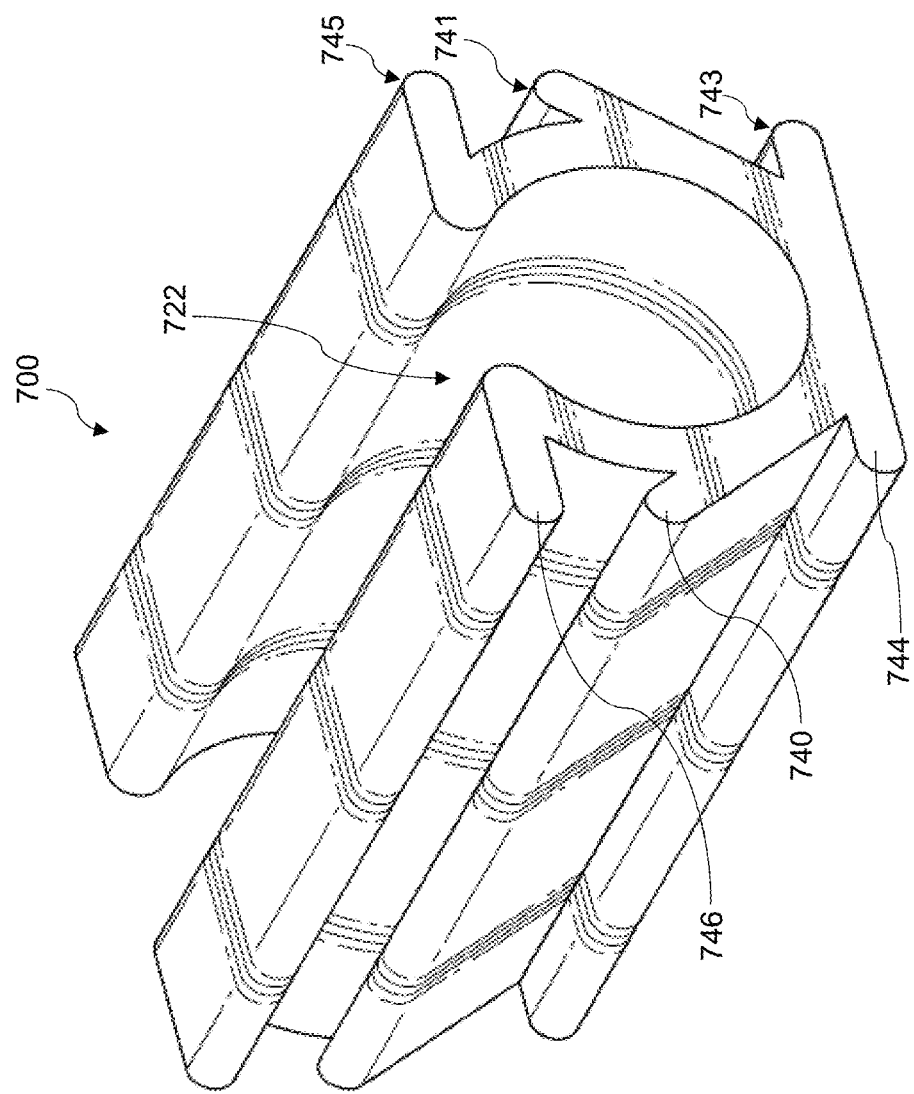
FIG. 7 illustrates a bottom perspective view of a towel clip, in accordance with a representative embodiment.

FIG. 7 illustrates a bottom perspective view of a towel clip, in accordance with a representative embodiment. The clip 700 shown in this figure may be substantially the same clip as that shown in FIG. 6, but rotated vertically 180 degrees along a longitudinal axis through the elongated body. This view of the clip 700 clearly shows the cavity 722, the first set 741 of tabs formed by first tabs 740 projected from the side portions of the elongated body of the clip 700, the second set 743 of tabs formed by second tabs 744 projected from the top end of the elongated body of the clip 700, and the third set 745 of tabs formed by third tabs 746 projected from the bottom end of the elongated body of the clip 700.

Figure 8:
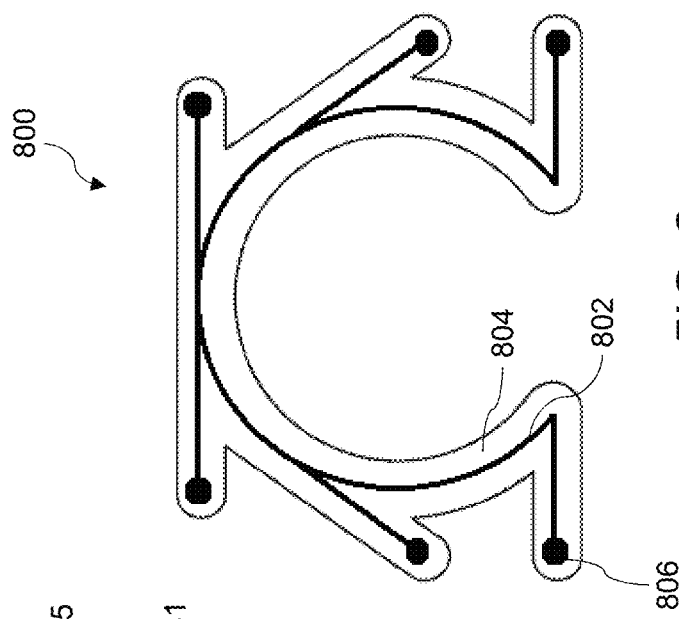
FIG. 8 illustrates a cross-sectional view of a towel clip, in accordance with a representative embodiment.

FIG. 8 illustrates a cross-sectional view of a towel clip, in accordance with a representative embodiment. The clip 800 shown in this figure may include a plurality of materials that make up the elongated body of the clip 800. For example, the elongated body of the clip 800 may include an interior member 802 and an exterior member 804 (e.g., an exterior coating). The interior member 802 may be made of a first material and the exterior member 804 may form an exterior coating made of a second material substantially surrounding the interior member 802. In an aspect, the first material is different than the second material, e.g., the first material may have a greater hardness than the second material.

As shown in the figure, the interior member 802 may include blunt edges 806, e.g., rounded edges or edges that are formed into balls or the like. The blunt edges 806 or otherwise soft edges may prevent the interior member 802 from cutting through the material of the exterior member 804 (e.g., metal from protruding through silicone).

As shown in FIG. 8, as opposed to FIG. 3, the interior member 802 of the clip 800 may extend into the tabs of the clip 800. Alternatively, as shown in FIG. 3 above, the interior member of the clip may not extend into the tabs of the clip.

In FIGS. 6-8, it can be seen that the clip may include three sets of tabs—upper, middle and lower—that can be gripped by a user and used to pull the clip off of an edge of a structure (e.g., the back of a chair or other surface on which a towel or other item has been removably affixed by the clip). Thus, any one of the three sets of tabs, or combination of the three sets of tabs, can be used by the user to pull the clip off of a surface to which it has been clipped. In this manner, grabbing more than one of the sets of tabs may make it easier to pull the clip off. Similarly, any one of the three sets of tabs, or combination of the sets of tabs, may be used to push the clip down onto an edge of a structure of suitable size and dimensions to be received by the interior portion (e.g., substantially circular interior portion) of the clip. In particular, a force exerted by a user on the top portion of the clip may be especially useful for pushing the clip onto an edge of a structure.

These figures also show one, two, and three sets of two or more tabs. However, a person skilled in the art will recognize that more tabs are possible.

As shown above in FIGS. 1-8, the cross-section of the cavity of the clip when viewed from one or more of the first end and the second end may be substantially circular. In an aspect, the inner diameter of the substantially circular cavity of the clip is about 1.5 inches. Other dimensions are also or instead possible.

Figure 9:
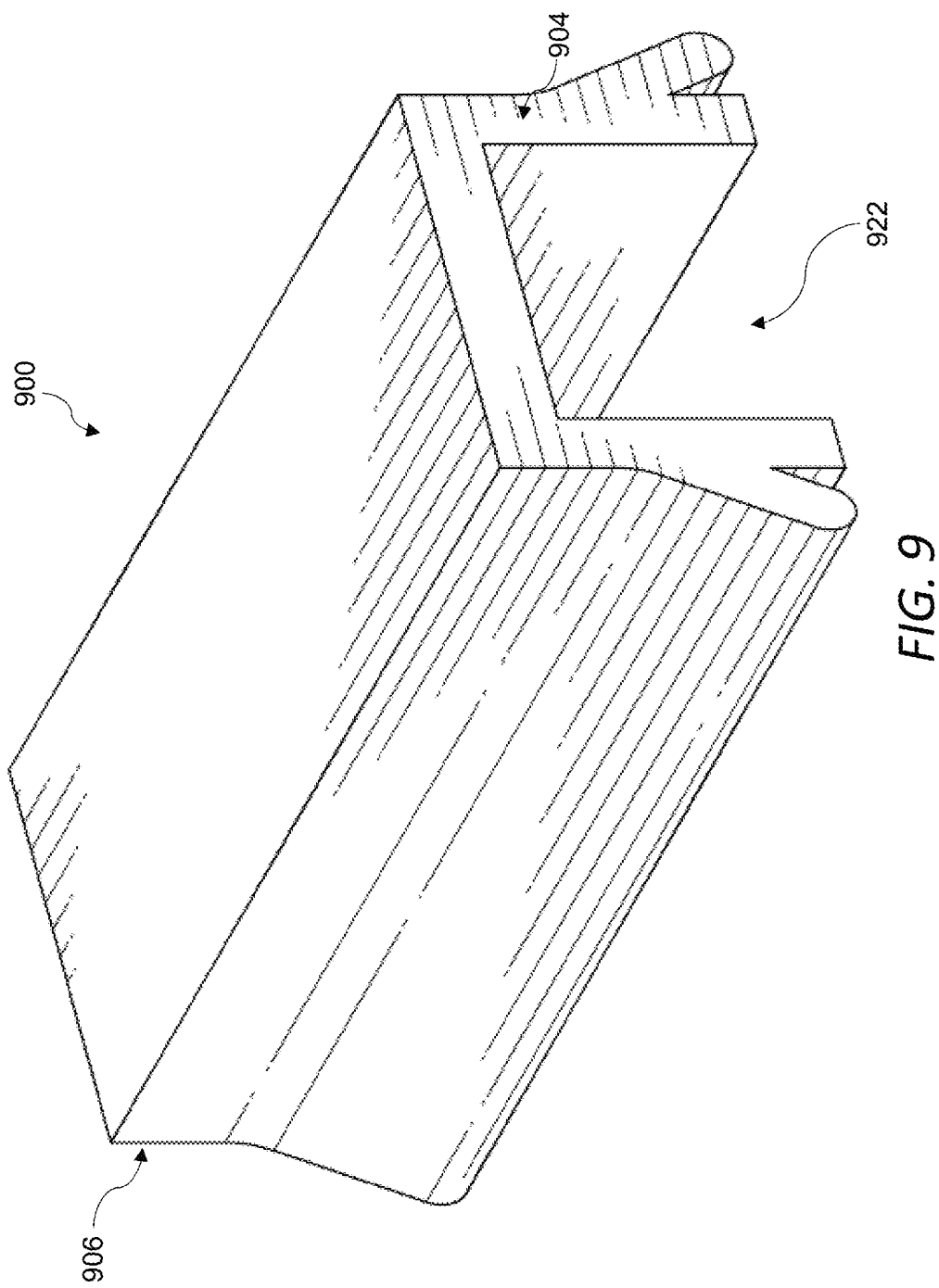
FIG. 9 illustrates a top perspective view of a towel clip, in accordance with a representative embodiment.

FIG. 9 illustrates a top perspective view of a towel clip, in accordance with a representative embodiment. As shown in the figure, the cross-section of the cavity 922 of the clip 900 when viewed from one or more of the first end 904 and the second end 906 may be substantially polygonal. In particular, the cross-section of the cavity 922 may be substantially square. In an aspect, the length across the opening of the cavity 922 is about 2 inches, and the depth of the cavity is about 2 inches, which yields a substantially square cross-section of the cavity 922 having dimensions of about 2 by 2 inches. This embodiment may be useful for removably securing the clip to a deck rail or the like, which may have an edge with a width of about 2 inches (e.g., utilizing a 2 by 4 inch piece of material). In another aspect, the cross-section of the cavity 922 is substantially rectangular. For example, the length across the opening of the cavity 922 may be about 1 inch, and the depth of the cavity may be about 2 inches, which yields a substantially rectangular cross-section of the cavity 922 having dimensions of about 1 by 2 inches. This embodiment may be useful for removably securing the clip to a picnic table or the like, which may have an edge with a width of about 1 inch.

Figure 10:
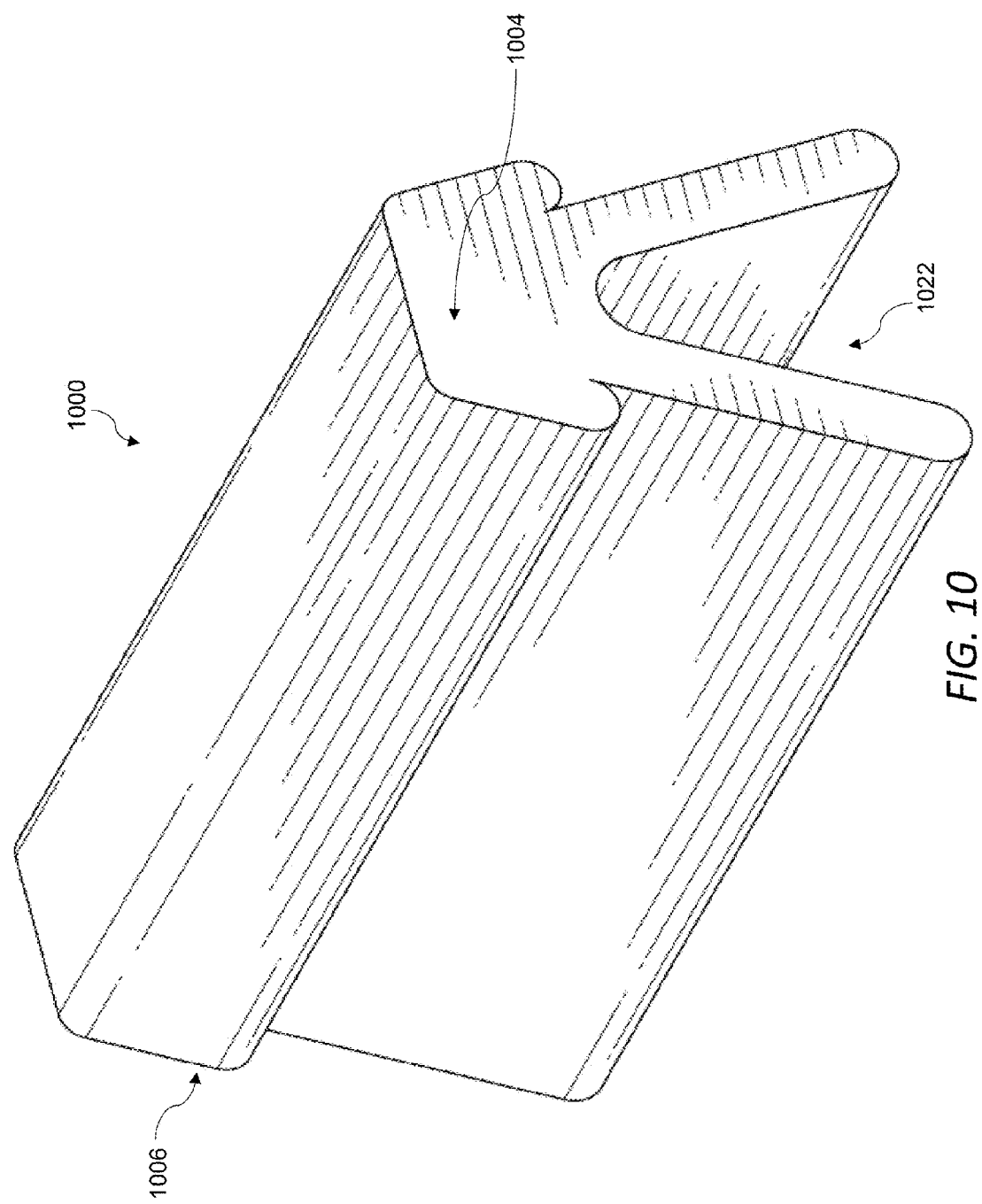
FIG. 10 illustrates a top perspective view of a towel clip, in accordance with a representative embodiment.

FIG. 10 illustrates a top perspective view of a towel clip, in accordance with a representative embodiment. As shown in the figure, the cross-section of the cavity 1022 of the clip 1000 when viewed from one or more of the first end 1004 and the second end 1006 of may be substantially polygonal. In particular, the cross-section of the cavity 1022 may be substantially triangular. The substantially triangular cross-section may be advantageous for use of the clip 1000 on structures such as strings, wires, cords, and the like. The substantially triangular cross-section may also or instead create a snug fit with other types of structures, such as those having angled or beveled edges.

In an aspect, the length of the clip 1000 may range from about 0.5 inches to 3.0 inches.

Other polygonal shapes, or other shapes entirely, in addition to those shown in FIGS. 9 and 10, are also or instead possible for the cross-section of the cavity or otherwise for the clip. For example, fanciful shapes like hearts, stars, zig-zags, and the like may be used. Or other curved shapes like ovals, egg-shapes, waves, and the like may be used.

Figure 11:
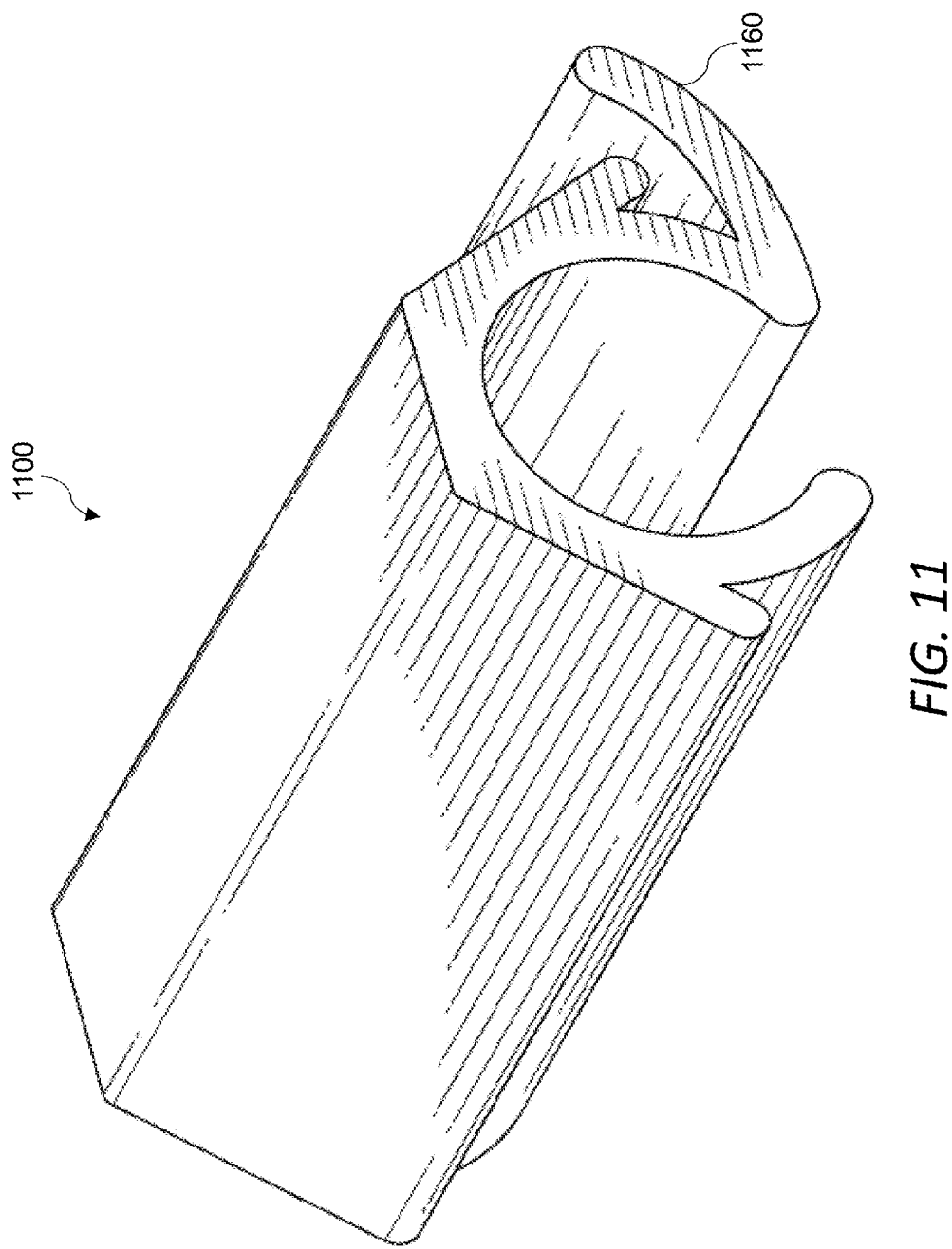
FIG. 11 illustrates a top perspective view of a towel clip, in accordance with a representative embodiment.

FIG. 11 illustrates a top perspective view of a towel clip, in accordance with a representative embodiment. As shown in the figure, in an aspect, the clip 1100 includes a hook 1160. Although shown projected out from the elongated body from the bottom end of the clip 1100, the hook 1160 may also or instead be projected out from the elongated body from one or more of the top end or the side portions (e.g., one or more of the side portions) of the clip 1100.

The hook 1160 may include a substantially curvilinear shape as shown in the figure. The hook 1160 may be sized and shaped, and made of a material that permits items to be hung from the hook 1160, e.g., when the clip 1100 is engaged with a structure. For example, items such as bags, purses, backpacks, clothing, towels, blankets, string, cord, handles, and the like may be hung from the hook 1160.

Figure 12:
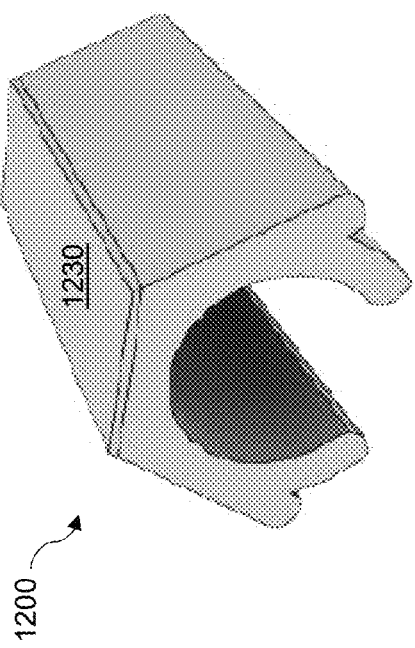
FIG. 12 illustrates a top perspective view of a towel clip, in accordance with a representative embodiment.

FIG. 12 illustrates a top perspective view of a towel clip, in accordance with a representative embodiment. The clip 1200, and any of the other clips described herein may be manufactured using molds. In particular, the interior member (e.g., metal interior member), may have the exterior member (e.g., silicone or the like exterior member) molded around the interior member via an injection molding process or the like. The molds may be adapted to provide several mold options that will allow for the clip to have a plurality of tabs as discussed herein. In an aspect, both of the interior member and the exterior member are manufactured via an injection molding process or the like. Other fabrication methods are also or instead possible.

In an aspect, and as discussed above, the top end (e.g., the pushing surface 1230) may include one or more of text, numbering, or a design—e.g., for advertising or promotional purposes. In this manner, the mold that is used to create the exterior member around the interior member may utilize a replaceable panel or the like (e.g., a sliding panel), such that the clip 1200 can be manufactured with different pushing surface 1230 decorations without having to change an entire mold—i.e., in an aspect, only the sliding panel is replaced with a different sliding panel for different decorations on the clip 1200. Such a sliding panel may allow for a clip 1200 manufactured with the mold to include, e.g., a blank top or a top that includes a decoration—e.g., one or more of text, numbering, or a design on the top end of the clip 1200 such that the clip 1200 is imprinted for promotional branding or the like. This may include an imprint that can be debossed, silkscreened, debossed with a color fill, and the like.

Figure 13:
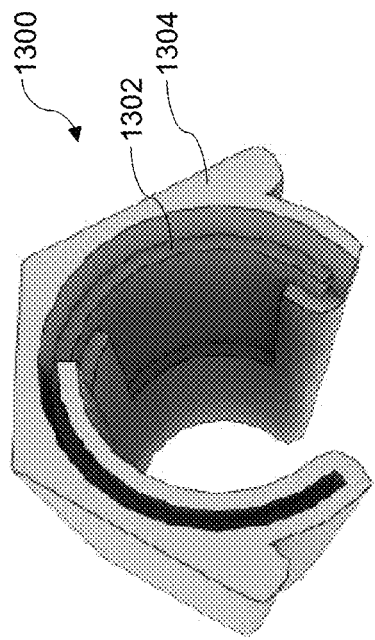
FIG. 13 illustrates a cutaway perspective view of a towel clip, in accordance with a representative embodiment.

FIG. 13 illustrates a cutaway perspective view of a towel clip, in accordance with a representative embodiment. As shown in the figure, the cutaway of the clip 1300 shows the interior member 1302, which may be made of metal or the like, and the exterior member 1304, which may be made of silicone or the like.

Figure 14:
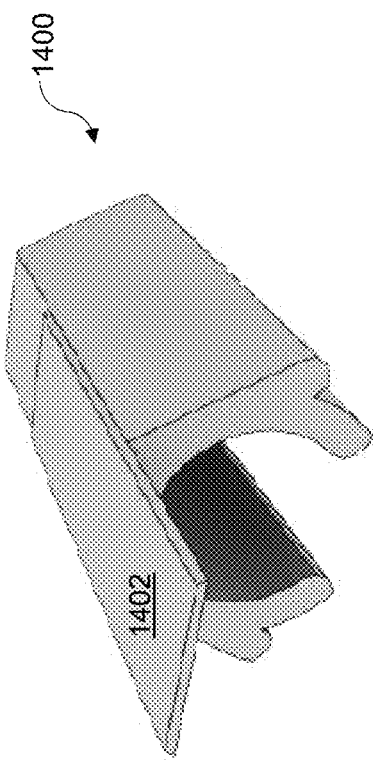
FIG. 14 illustrates a top perspective view of a towel clip, in accordance with a representative embodiment.

FIG. 14 illustrates a top perspective view of a towel clip, in accordance with a representative embodiment. The clip 1400 shown in the figure demonstrates that the top surface 1402 may be interchangeable in an embodiment, e.g., for promotional purposes or the like. In an aspect, merely a sliding panel of a mold is interchangeable for changing the top surface 1402 of the clip 1400, i.e., where the top surface 1402 is integral and permanent with the body of the clip 1400.

Figure 15:
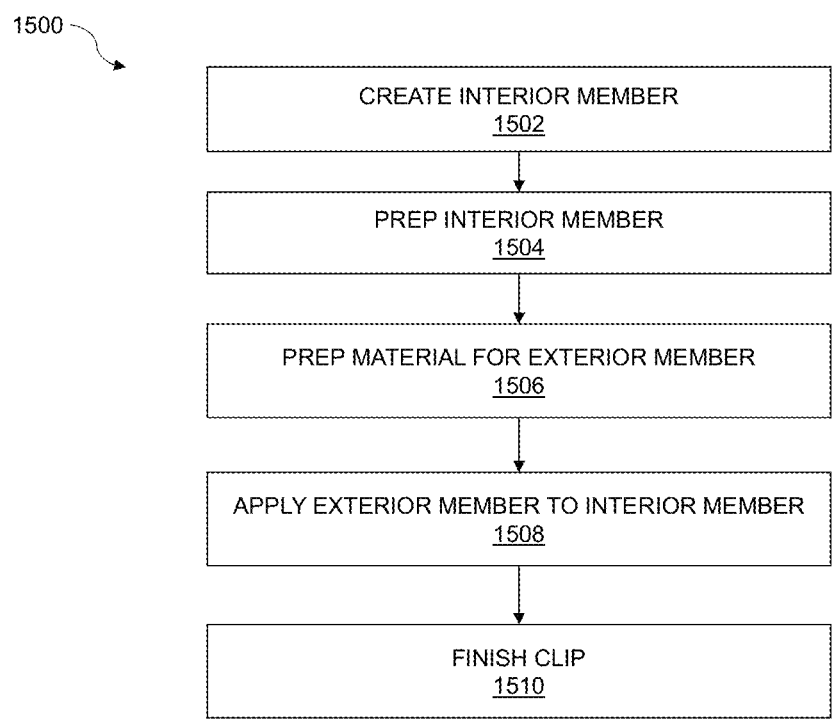
FIG. 15 illustrates a flow chart of a method for manufacturing a towel clip, in accordance with a representative embodiment.

FIG. 15 illustrates a flow chart of a method for manufacturing a towel clip, in accordance with a representative embodiment. Other methods for manufacturing are also or instead possible, as will be understood in the art based on the disclosure for the clip as described herein.

As shown in block 1502, the method 1500 may include creating the interior member for the clip. The interior member may include a metal material, e.g., steel or the like, as discussed herein. The interior member may be created by casting, molding, forming, machining, joining, additive manufacturing (e.g., three-dimensional printing), coating, and the like. For example, in an aspect, the shape of the interior member may be created by forming one or more pieces of metal material by one or more of cutting, bending, pressing, rolling, stamping, forging, or the like. In another aspect, liquid metal material may be molded or cast into the shape of the interior member (e.g., using metal injection molding or the like).

As shown in block 1504, the method 1500 may include prepping the interior member. This may including prepping the material of the interior member before the interior member takes shape, or prepping the interior member after it is formed into its shape. For example, in an aspect, one or more pieces of metal material may be treated prior to forming into the shape of the interior member. The interior member may also or instead undergo prepping after it is formed into its shape, but prior to receiving the exterior member thereon. In an aspect, the metal is treated by baking or sintering the metal. In an aspect, the metal is treated by one or more sulfuration processes. In an aspect, the metal is heat treated or cold treated. Any other treatment known in the art may also or instead be performed on the interior member.

Prepping the interior member may also or instead include applying a substance to the material of the interior member. For example, a substance such as a coating, glue, or the like may be applied to metal that forms the interior member, e.g., where the coating, glue, or the like assists in adhesion of the exterior member thereon.

As shown in block 1506, the method 1500 may include prepping the material for the exterior member. This may include creating a silicone or silicone-like material for use as a coating of the interior member. Prepping the material for the exterior member may also or instead include testing the material of the exterior member or a portion thereof. Prepping the material for the exterior member may also or instead include coloring the material. Prepping the material for the exterior member may also or instead include placing the material into a molding device for molding the material around the interior portion. Prepping the material for the exterior member may also or instead include cutting the material for adhering slices of the material to the interior portion. Any other prepping or treatment known in the art may also or instead be performed on the material.

As shown in block 1508, the method 1500 may include applying the exterior member to the interior member. This may include injection molding the material onto the interior member, coating the interior member, extruding the material onto the interior member, adhering the material onto the interior member, machining the material onto the interior member, casting the material onto the interior member, and the like. In an aspect where the interior member is metal and the exterior member is silicone, the interior member is placed into a mold where silicone is injected around the interior member to form the clip.

As shown in block 1510, the method 1500 may include finishing the clip. This may include further treatment of the materials that make-up the clip. This may also or instead include testing the clip, checking the clip for quality, or the like.

As discussed above, the various clips described herein can be used to releasably secure various items, including towels and the like, which may include various characteristics—e.g., size, weight, shape, material, and so forth. As such, the size, weight, shape, material, and so forth of the clips described herein can be adapted in manufacturing to suit their intended purpose. By way of example, and not limitation, a towel clip may be in the range of about 2.5 to 5.0 inches long and about 1.5 inches tall. In an aspect, the clip includes a length of the elongated body of about 4.0 inches. Other aspects include clips ranging in length from about 0.5 inches to about 8.0 inches. Other sizes are also possible.

As discussed above, the various clips described herein may have various tab configurations. For example, a clip may include a first set of two or more tabs disposed along the side portions of the elongated body and projected out from the side portions at an acute angle, where the first set of two or more tabs are sized and shaped to provide a gripping surface on the side portions of the elongated body for the user to pull the clip off of the edge of the structure. The clip may also or instead include a second set of two or more tabs, a third set of two or more tabs, and so on, e.g., disposed on at least one of the top end of the elongated body and the bottom end of the elongated body, or disposed on the side portions of the elongated body of the clip. In this manner, the clip may allow for a gripping surface for the user in the location of the tabs on the clip. A user may grip the clip from one location, two locations, three locations, and so on. In an aspect, a user grips the clip from the tabs in three locations—at the top end, along the side portions (e.g., substantially in the middle of the clip), and at the bottom end of the clip, which correspond to top, middle, and bottom sets of tabs. Thus, the clip may have one or more of these sets of tabs, in various combinations, on a single clip. A purpose of the variety of locations in which to grab the clip may be to accommodate a user's strength or the size of a user's hand/fingers.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A clip for removably and releasably securing an item onto a structure, the clip comprising:
    a singular, elongated body having a first end, a second end, a top end, a bottom end, and side portions disposed between the top end and the bottom end;
    an interior portion forming a cavity on the bottom end of the elongated body and extending between the first end and the second end, the cavity sized and shaped to receive an edge of the structure for removably securing the clip to the structure;
    a pushing surface formed on the top end of the elongated body; and
    a first set of two or more tabs forming angled surfaces extending from the pushing surface and disposed along the side portions of the elongated body, the angled surfaces projected out from the side portions at an acute angle, the first set of two or more tabs sized and shaped to provide a gripping surface on the side portions of the elongated body for the user to pull to widen the cavity for securing the clip onto the edge of the structure and to grip to pull the clip off of the edge of the structure.

2. The clip of claim 1, where the elongated body comprises an interior member made of a first material and an exterior coating made of a second material substantially surrounding the interior member, the first material having a greater hardness than the second material.

3. The clip of claim 2, where ends of the side portions adjacent to the cavity of the elongated body are separated by a first distance when no forces are applied to the clip, and where the first material and the second material each comprise an elasticity selected such that the ends of the side portions are structurally configured to be widened to a second distance greater than the first distance to accept the edge of the structure within the cavity and to substantially return to the first distance when removed from the edge of the structure.

4. The clip of claim 2, where the first material comprises a metal.

5. The clip of claim 4, where the second material comprises one or more of a plastic and an elastomer.

6. The clip of claim 4, where the first material comprises one or more of manganese steel and a shape memory alloy.

7. The clip of claim 1, further comprising a second set of two or more tabs disposed on at least one of the top end of the elongated body and the bottom end of the elongated body.

8. The clip of claim 7, where the first set of two or more tabs and the second set of two or more tabs are positioned to allow a user to simultaneously grab tabs from both the first set and the second set for use as the gripping surface to secure the clip onto the edge of the structure and to pull the clip off of the edge of the structure.

9. The clip of claim 7, where the second set of two or more tabs is disposed on the top end of the elongated body, the clip further comprising a third set of two or more tabs disposed on the bottom end of the elongated body.

10. The clip of claim 9, where the first set of two or more tabs, the second set of two or more tabs, and the third set of two or more tabs are positioned to allow a user to simultaneously grab each of the first set, the second set, and the third set for use as the gripping surface to secure the clip onto the edge of the structure and to pull the clip off of the edge of the structure.

11. The clip of claim 1, where each tab in the first set of two or more tabs is projected out substantially from the widest dimension of the side portions of the elongated body.

12. The clip of claim 1, where each tab in the first set of two or more tabs is projected out substantially from a central location of the side portions of the elongated body.

13. The clip of claim 1, where each tab in the first set of two or more tabs is disposed along an entire length of the elongated body.

14. The clip of claim 1, where the pushing surface comprises a substantially flat surface.

15. The clip of claim 14, further comprising one or more of text, numbering, or a design on the substantially flat surface.

16. The clip of claim 1, where a cross-section of the cavity viewed from one or more of the first end and the second end is substantially circular.

17. The clip of claim 1, where a cross-section of the cavity viewed from one or more of the first end and the second end is substantially polygonal.

18. The clip of claim 17, where the cross-section of the cavity is one of substantially square, substantially rectangular, or substantially triangular.

19. The clip of claim 1, further comprising a hook projected out from the elongated body from at least one of the top end, the bottom end, or one of the side portions.

20. The clip of claim 1, where the pushing surface is sized and shaped for the user to removably secure the clip on the edge of the structure by applying a force to the pushing surface.

* * * * *